(12) United States Patent
Oyamada et al.

(10) Patent No.: US 8,967,613 B2
(45) Date of Patent: Mar. 3, 2015

(54) IMAGE READING APPARATUS

(71) Applicants: Ai Oyamada, Konan (JP); Toshiya Inada, Nagoya (JP)

(72) Inventors: Ai Oyamada, Konan (JP); Toshiya Inada, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 0 days.

(21) Appl. No.: 14/045,833

(22) Filed: Oct. 4, 2013

(65) Prior Publication Data
US 2014/0151959 A1    Jun. 5, 2014

(30) Foreign Application Priority Data

Nov. 30, 2012 (JP) ................................ 2012-262902

(51) Int. Cl.
*B65H 83/00* (2006.01)
*B65H 11/00* (2006.01)
*B65H 5/00* (2006.01)

(52) U.S. Cl.
CPC . *B65H 11/00* (2013.01); *B65H 5/00* (2013.01)
USPC ........................................ 271/3.14; 399/367

(58) Field of Classification Search
CPC ................ G03G 2215/00189; H04N 1/00591; H04N 1/00588; H04N 1/0057; B65H 2801/03; B65H 2801/06; B65H 2801/09; B65H 2801/39
USPC .................................. 271/3.14; 399/367, 380
See application file for complete search history.

(56) References Cited

U.S. PATENT DOCUMENTS

| | | | |
|---|---|---|---|
| 7,338,043 B2 * | 3/2008 | Sorenson et al. | 271/162 |
| 7,970,337 B2 * | 6/2011 | Uchida et al. | 399/367 |
| 8,526,080 B2 | 9/2013 | Kozaki | |
| 2011/0157662 A1 | 6/2011 | Kozaki | |

FOREIGN PATENT DOCUMENTS

JP    4930580 B2    5/2012

\* cited by examiner

*Primary Examiner* — Michael McCullough
(74) *Attorney, Agent, or Firm* — Banner & Witcoff, Ltd.

(57) ABSTRACT

An image reading apparatus includes: a main body including a document table; a document cover that includes a rear end portion supported by the main body, and a front end portion configured to be movable with respect to the main body; a conveyer that is disposed in the document cover and is configured to feed a document; and a reader that is provided in the main body. The document cover includes a lower layer portion having a wall surrounding front, rear, left and right of the conveyer and an upper layer portion covering over the conveyer. The lower layer portion includes a bottom having a shape covering the document table. The wall extends upward from an outer periphery of the bottom. The upper layer portion includes a grip portion which protrudes frontward from the upper layer portion.

7 Claims, 5 Drawing Sheets

IMAGE READING APPARATUS

CROSS REFERENCE TO RELATED APPLICATION

This application is based upon and claims the benefit of priority of Japanese Patent Application No. 2012-262902 filed on Nov. 30, 2012, the contents of which are incorporated herein by reference in its entirety.

BACKGROUND

The present disclosure relates to an image reading apparatus.

The image reading apparatus called the flatbed type is equipped with a document cover that spreads over the document table. The document cover of this type has a grip portion which a user may utilize to open and close the document cover.

The document cover is formed with a concave in a front-end center thereof so that the concave may be used as a grip portion.

SUMMARY

However, where there are restrictions to the installation site of an image reading apparatus for example, it is in some cases difficult for a user to put an user's hand to the front-end center of the document cover depending upon a certain relationship of installation site and setup direction. In such a case, the document cover when opened and closed is problematically not well in the feeling of handling.

There are cases where the document cover like the above is equipped with an automatic conveyer (hereinafter, abbreviated as an ADF). The ADF of this kind, in many cases, is not symmetric in weight proportion left and right about a grip portion provided at a front-end center of the document cover, i.e. the ADF has a center of gravity deviated in any of left and right. When the document cover is opened and closed by using the grip portion provided at a front-end center thereof, the document cover might be distorted or not easily opened and closed because of a positionally deviated application of the ADF weight. This also incurs the problem the feeling of handling is not well in opening and closing the document cover.

An aspect of the present disclosure has been made in order to solve the problem and aims at providing an image reading apparatus capable of improving the feeling of handling in opening and closing the document cover.

The configuration adopted in the disclosure is described below.

An image reading apparatus comprising:

a main body comprising a document table;

a cover that comprises a rear end portion supported by the main body, and a front end portion configured to be movable with respect to the main body, the cover covering the document table in a close position in which the front end portion is lowered, and the document table being exposed in an open position in which the front end portion is lifted;

a conveyor that is disposed to the cover and is configured to convey a document along a conveyance path; and a reader that is disposed in the main body, is configured to be movable in a moving direction and is configured to read an image of the document placed on the document table or conveyed by the conveyor, wherein the cover comprises a lower layer portion having a wall surrounding front, rear, left and right of the conveyor and an upper layer portion covering over the conveyor, wherein the lower layer portion comprises a bottom having a shape covering the document table, wherein the wall extends upward from an outer periphery of the bottom, wherein the upper layer portion comprises a grip portion which protrudes frontward from the wall.

DESCRIPTION OF EXEMPLARY EMBODIMENTS

Figure 1:
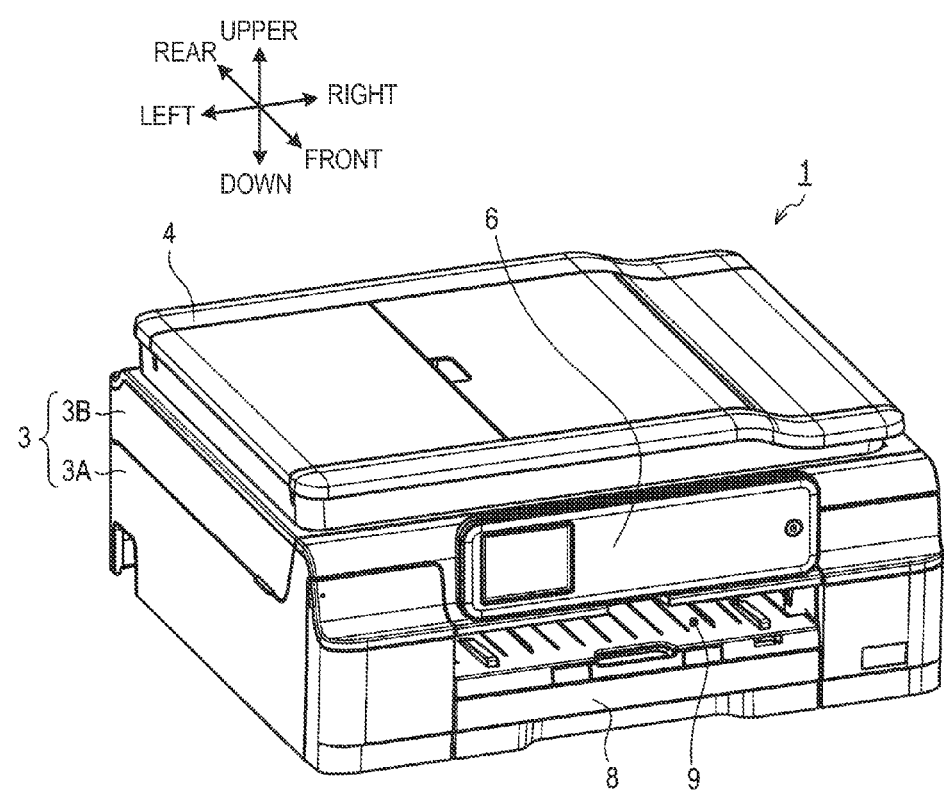
FIG. 1 is a perspective view showing an exterior appearance of a multifunction device in its.

A embodiment according to the present disclosure will now be described by taking an example. In the present embodiment, a multifunction device having a function (of scanning) of an image reading apparatus and, in addition, other functions (e.g. printing, copying, facsimile transmission/reception, etc.) is exemplified as an example of an image reading apparatus.

In the following, various parts of a multifunction device are explained by use of directional indications of up, down, left, right, front and rear given in each figure. These directional indications are merely to briefly explain the relative positional relationship of various parts of a multifunction device but not intended to restrict the relative position to a site where to set up a multifunction device, the relative position of a multifunction device to a user, or the like.

Construction of the Multifunction Device

A multifunction device 1 includes a main body 3 and a document cover 4 mounted on the main body 3. The main body 3 has a lower body 3A and an upper body 3B mounted on the lower body 3A.

An operation unit 6 to be operated by a user is provided in a front upper region thereof. A paper cassette 8 is received in a lower part of the lower body 3A, in which recording mediums before printing are to be placed. An output port 9 is provided in a position front of the main body 2, below the controller 6 and above the paper cassette 8, through which a printed recording medium is to be outputted.

Figure 2:
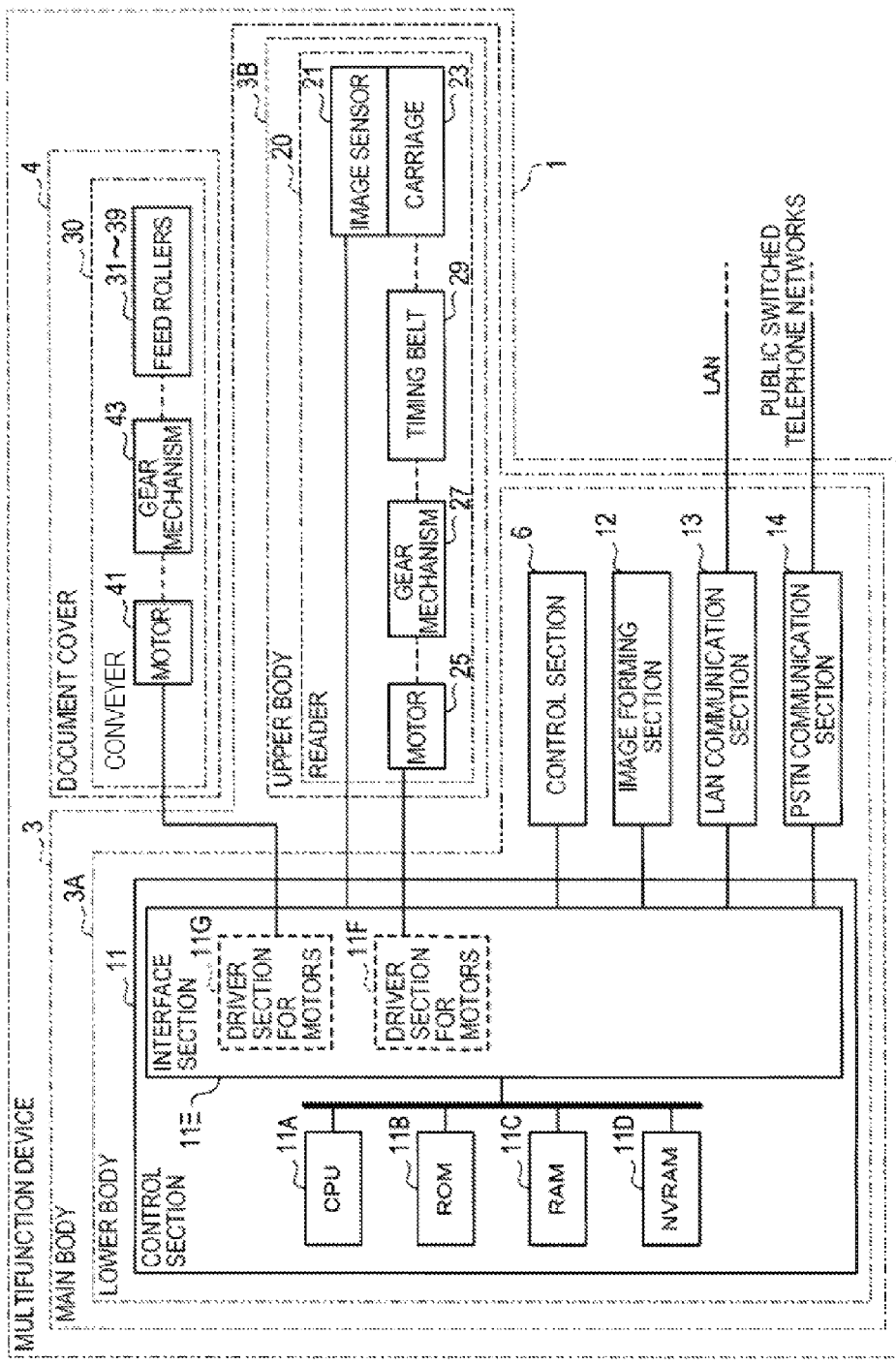
FIG. 2 is a block diagram showing an internal configuration of the mu unction device.

The lower body 3A includes, besides the operation unit 6, a control section 11, an image forming section 12, a LAN communication section 13 and a PSTN communication section 14, as shown in FIG. 2. The control section 11 has a CPU 11A, a ROM 11B, a RAM 11C, an NVRRAM 11D, an interface section 11E and so on, which are well known. The CPU 11A executes a predetermined process according to a control program stored in the ROM 11B or RAM 11C and thereby effects control over various sections of the multifunction device 1.

The image forming section 12 has an electrophotographic or inkjet print mechanism. The LAN communication section 13 is configured with a communication interface device compatible with wireless LANs and a communication interface device compatible with wired LANs. The PSTN communication section 14 is configured with various devices, including FAX modems and voice codecs, required in connection to public switched telephone networks (PSTNs).

The operation unit 6 has an input device (e.g. a touch panel, buttons and switches) which a user operates when giving various instructions to the multifunction device 1 and an output device (e.g. a liquid-crystal display) which informs a user of operation states, etc of the multifunction device 1.

The upper body 3B includes a reader 20. The reader 20 is configured corresponding to a flatbed image scanner. Specifically, the reader includes a line image sensor 21 that has a plurality of reading elements, a carriage 23 that holds the image sensor 21, a motor 25, a gear mechanism 27 that is driven by the motor 25, and a timing belt 29 that is driven by the gear mechanism 27.

In the present embodiment, the image sensor 21 is given as a contact image sensor (CIS). The carriage 23 is coupled to the timing belt 29. The motor 25 operates based on a drive signal received from a driver section 11G for motors provided in the interface section 11E of the control section 11. The power generated by the motor 25 is delivered to the carriage 23 through the gear mechanism 27 and the timing belt 29. As a result, the carriage 23 moves in a lateral direction of FIG. 1 together with the image sensor 21.

The document cover 1 includes a conveyer 30. The conveyer 30 is configured corresponding to an ADF (automatic conveyer). Specifically, the conveyer 30 includes feed rollers 31-39 that convey documents along a predetermined path, a motor 41, a gear mechanism 43 that is operated by the motor 41, and so on. The motor 41 operates based on a drive signal received from the driver section 11G for motors provided in the interface section 11E of the control section 11. The power generated by the motor 41 is delivered to the feed rollers 31-39 through the gear mechanism 43. Some of the feed rollers 31-39 are given as drive rollers that are directly driven by the gear mechanism 43 and some of the rest are given as follower rollers that rotate following the drive rollers or documents. Owing to cooperation of the conveyer 30 and the reader 20, the multifunction device 1 functions as an ADF image scanner.

Details of the Main Body and Document Cover

Figure 3A:
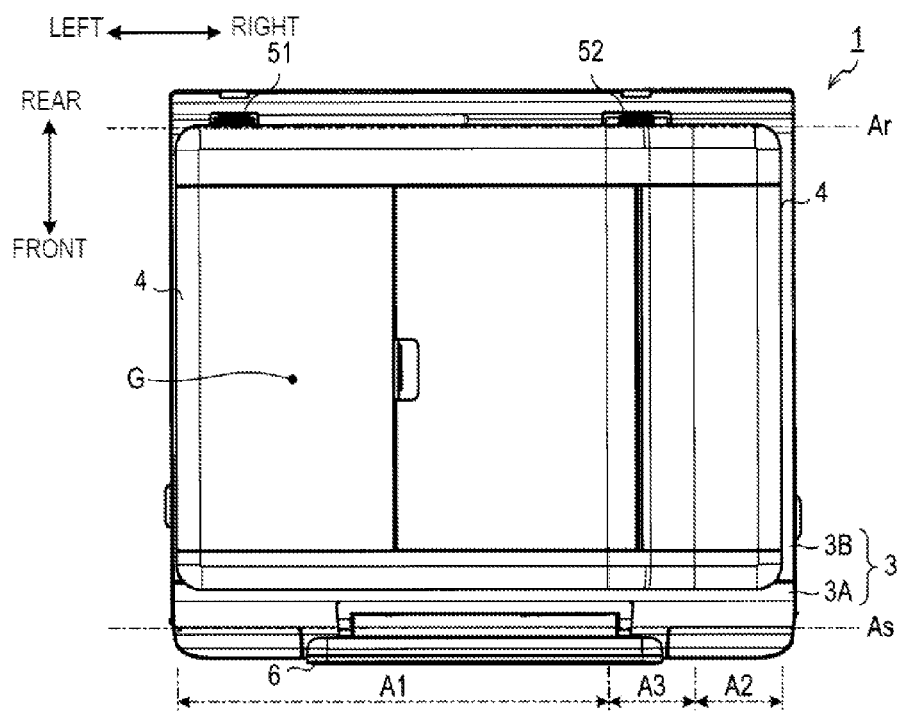
FIG. 3A is a plan view of a multifunction device and FIG. 3B is a plan view of a main body thereof.
Figure 3B:
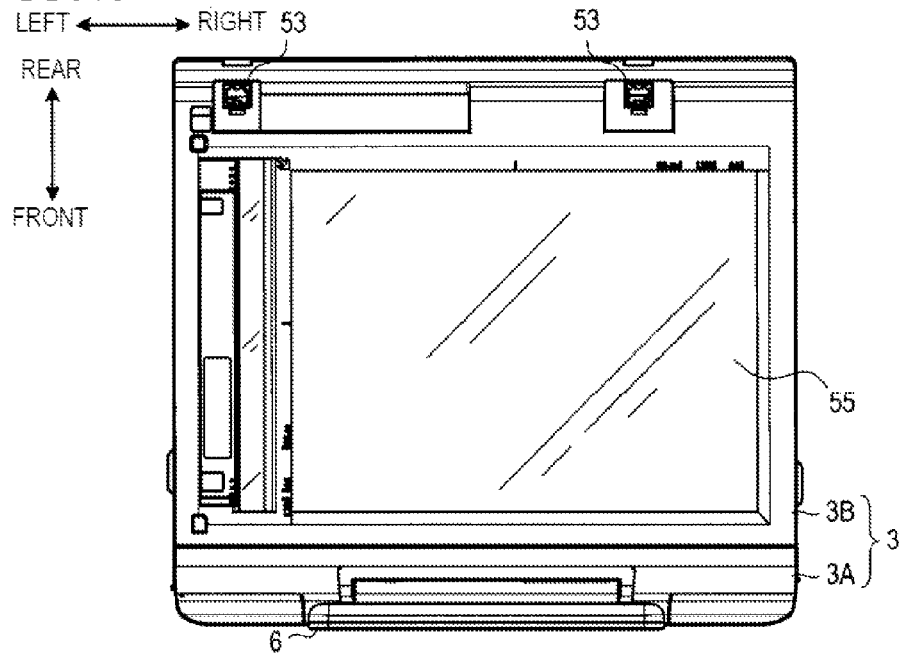

The document cover 4 is attached on the main body 3 through first and second hinges 51, 52 provided at a rear of the document cover 4, as shown in FIG. 3A. On an upper surface of the main body 3, slides 53 are provided to receive respective lower ends of the first and second hinges 51, 52 therein, as shown in FIG. 3B. By the slides 53, the first and second hinges 51, 52 are supported slidable in the up-down direction relatively to the main body 3.

A document table 55 of transparent glass is provided in the upper part of the main body 3 in a position where is covered by the document cover 4 when the document cover 4 is moved to its close position. The reader 20 is arranged below the document table 55 so that an image may be read out of a document placed on the document table 55 while moving the image sensor 21 along the document table 55.

Figure 4A:
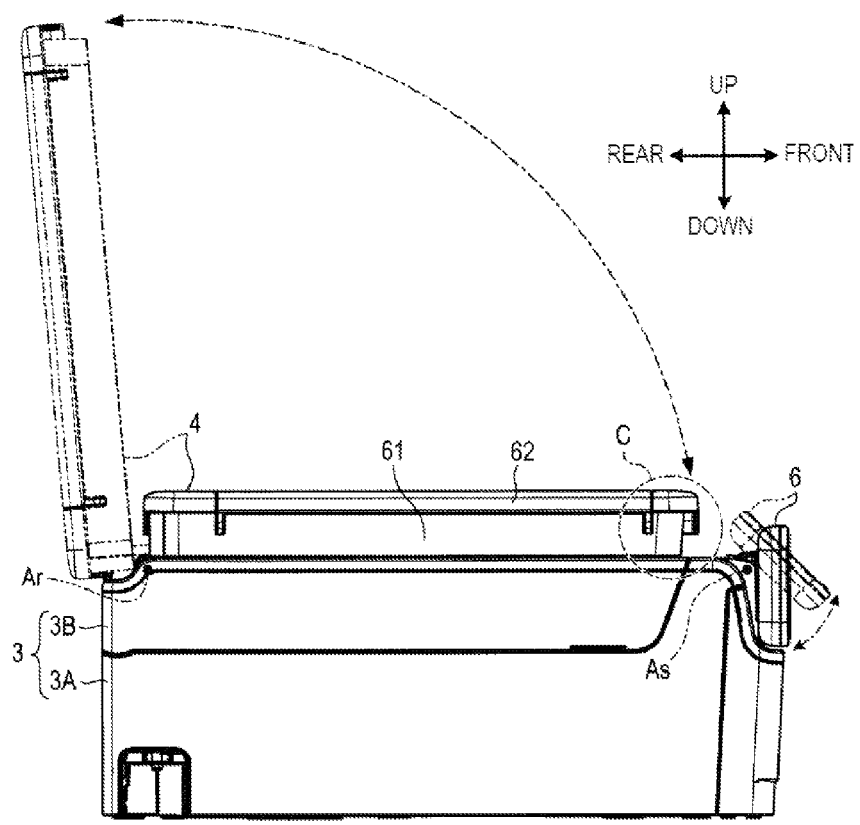
FIG. 4A is a left side view of the multifunction device and FIG. 4B is a magnified view of part C shown in FIG. 4A.

The first and second hinges 51, 52 rotatably support the document cover 4 about a virtual axis Ar (see FIGS. 3A and 4A) extending in the lateral direction. This allows the document cover 4 to open and close relatively to the main body 3, as shown in FIG. 4A. The operation unit 6 is pivotally supported by the main body 3 about a virtual axis As (see FIGS. 3A and 3B) extending in the lateral direction. This permits the operation unit 6 to be inclined desirably and adjusted in angle optimally for an individual user, which in turn improves the visibility of the display content on the operation unit 6 and the operability of the operation unit 6.

Figure 4B:
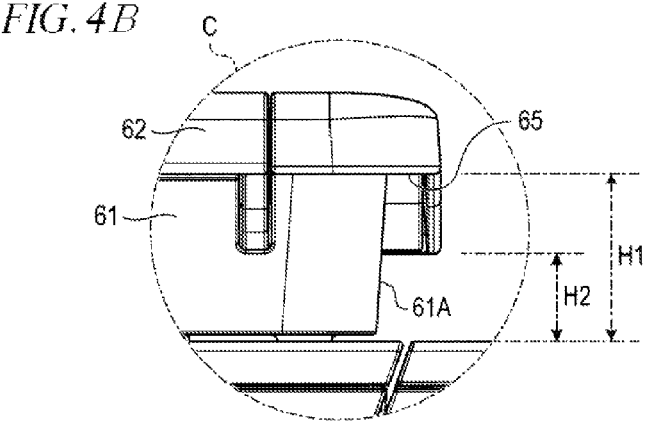
Figure 5:
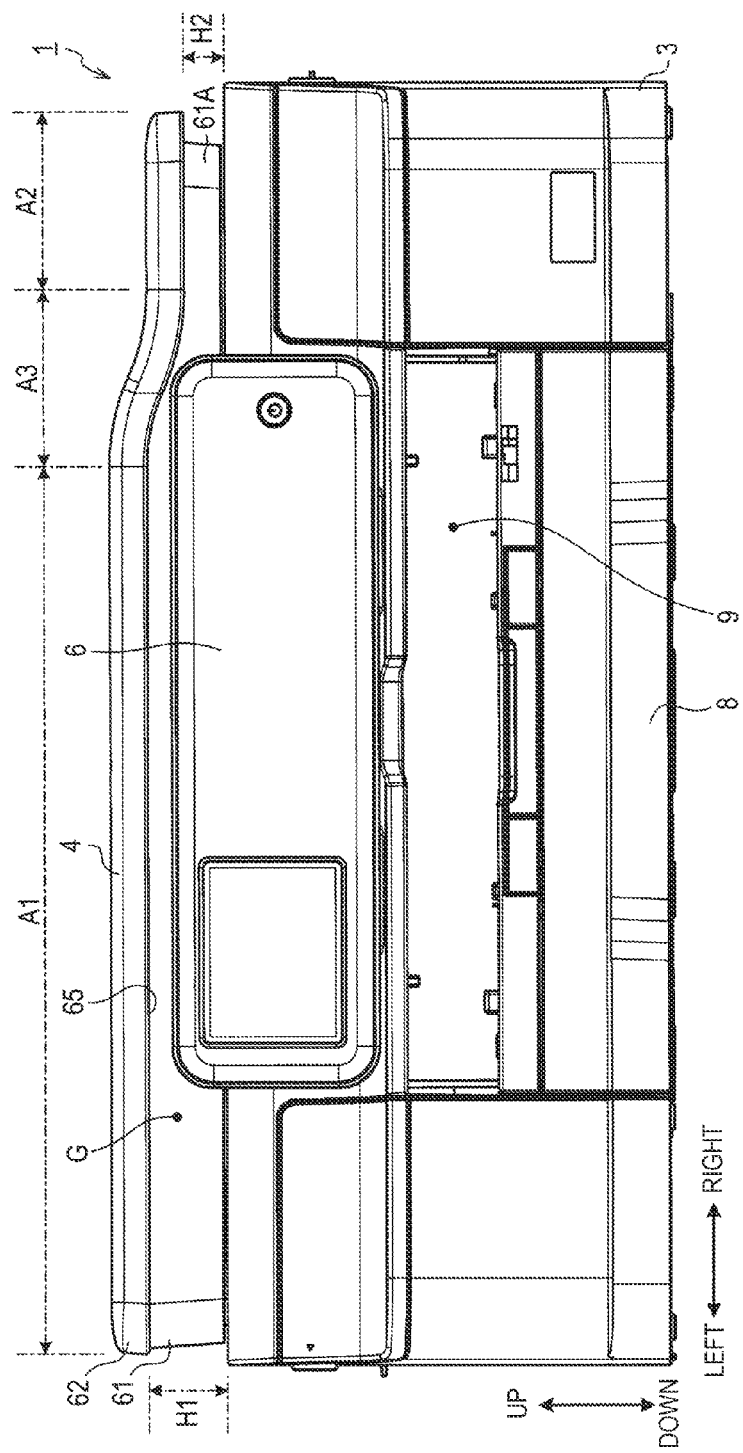
FIG. 5 is a front view of the multifunction device.

The document cover 4 includes a lower layer portion 61 having wall 61A surrounding front, rear, left and right of the conveyer 30 and an upper layer portion 62 covering over the conveyer 30, as shown in FIG. 5. The lower layer portion 61 has a bottom that is shaped and dimensioned to cover the document table 55, in which the wall 61A extends upward from a periphery of the bottom. The upper layer portion 62 includes a grip portion 54 which protrudes frontward from the wall 61A as shown in FIGS. 4A and 4B. The grip portion 65 is to be used by a user for moving the document cover 4 to the open position. The grip portion 65 extends from an end of the document cover to the end of the document cover in the lateral direction. That is, in the present embodiment, the grip portion 54 is provided at an entire width of the front side of the upper layer portion 61.

The lower layer portion 61 has a first region A1 where the wall 61A is given a first height H1, a second region A2 where the wall 61A has a second height H2 and a third region A3 where a height of the wall 61A is decreasing from the first region A1 toward the second region A2, as shown in FIGS. 4B and 5.

The upper layer portion 62 is a shape conforming to the height of the wall 61A of the lower layer portion 61 and made generally horizontally flat in its top surface in ranges corresponding respectively to the first and second regions A1, A2. In the range corresponding to the third region A3, the top surface is slanted descending in a direction from the first region A1 toward the second region A2. The spacing between the upper layer portion 62 and the document table 55 is given, in the first region A1, nearly equal to the height H1 of the wail 61 and, in the second region A2, nearly equal to the height H2 of the wall 61. Thus, the spacing between the upper layer portion 62 and the document table 55 (or upper surface of the main body 3) is given smaller in the range corresponding to the second region A2 than the range corresponding to the first region A1.

In the document cover 4, the greater part of the conveyer 30 is arranged deviated left. Thus, the conveyer 30 has a center of gravity G falling within a range overlapping with the first region A1 without an overlap with the second region A2.

With regard to the first and second hinges 51, 52, the first hinge 51 is provided left with respect to the center of gravity G of the document cover 4 whereas the second hinge 52 is provided right with respect to the center of gravity G of the document cover 4. Moreover, the second hinge 52 is provided in a position closer to the geometric center in the lateral direction of the multifunction device 1 than the first hinge 51 and off the second region A2. The operation unit 6 is provided in a range overlapping with the first region A1 with respect to the lateral direction.

Effects

According to the above multifunction device 1, the upper layer portion 62 includes the grip portion 65 which protrudes frontward from the wall 61A. The grip portion 65 is used by an user to open and close the document cover 4. The grip portion 65 has a width to be maximally taken equal to that of the document cover 4 in the lateral direction. Due to this, user's hand may easily access any part of the grip portion even in a position deviated toward a left or right end, as compared to the configurationwa with a recess formed in a front-end center of the document cover 4.

Owing to an improved freedom of access with the hand, a user is allowed to bring a user's hand to a desired position. In case it is not easy to put a hand to a vicinity of a center of the document cover 4, there is an improved capability of putting hand to another position. This improves the easiness to handle the document cover 4 during opening and closing thereof.

Meanwhile, it is also possible to put a hand in a position closer to the center of gravity G of the conveyer 30. This suppresses the document cover 4 from being distorted and improves the feeling of handling during opening and closing the document cover 4.

In the first region A1 of the document cover 4 which mainly bears the weight of the conveyer 30, the spacing between the upper layer portion 62 and the document table 55 is taken greater so that a user may easily rut the user's hand there. Conversely, in the second region A2 which less bears the weight of the conveyer 30, the spacing between the upper layer portion 62 and the document table 55 is taken smaller so that it is not easy for a user to put the user's hand there as compared with the first region. In case a user opens or closes the document cover 4 with the user's hand put in a desired position, the hand is naturally in a position closer to the center of gravity G of the conveyer 30 during open or close operation. Thus, a user, even if not aware of whereabouts of the center of gravity G of the conveyer 30, may enjoy well the feeling of handling.

In the multifunction device 1, the document cover 4 has a center of gravity G existing in a position deviated closer to the left end of the multifunction device 1 and farther from the right end thereof with respect to a center thereof in the lateral direction. For this reason, the second hinge 52 is provided in a position closer to the geometric center, in the lateral direction, of the multifunction device 1 than the first hinge 51. Thus, the first and second hinges 51, 52 may be arranged equally close to the center of gravity G of the document cover 4. This permits the document cover 4 to open and close smoothly.

In the multifunction device 1, the second hinge 52 is provided in a position off the second region A2. Thus, the first hinge 51 and the second hinge 52 are not required to be spaced excessively. Instead, the first hinge 51 and the second hinge 52 may be arranged in positions balanced about and close to the center of gravity G of the document cover 4. This makes it easy to open and close the document cover 4.

The operation unit 6 is provided in a range overlapping with the first region A1, in Which range spacing is ensured sufficient between the conveyer 30 and the upper layer portion 62. Thus, there is less possibility that the hand hits the operation unit 6 when the document cover 4 is opened or closed. This improves the easiness to handle of the document cover 4 during opening and closing thereof.

In the multifunction device 1, the operation unit 6 may be swung and adjusted at an angle easy to operate. In such an adjustment, the operation unit 6 may be manually swung in a place where a space is ensured sufficient between the conveyer 30 and the upper layer portion 62. This improves the easiness to handle of the operation unit 6 during swinging thereof.

In addition, in the multifunction device 1, the upper layer portion 62 is shaped with a slant surface. The conveyer 30 is improved in appearance as compared to a configuration having a step formed in a slant surface.

Other Embodiments

Although the embodiment was described so far, the invention is not limited to the above concrete one embodiment but may be carried out variously in other embodiments.

For example, in the above embodiment, the image reader configured as a multifunction device was exemplified as one example of an image reading apparatus according to the invention, However, it is selective whether or not configured as a multifunction device, i.e. the present invention may be applied to a single function of an image reader, photocopier, facsimile machine or the like.

Further, in the present embodiment, the grip portion 54 is provided at an entire width of the front side of the upper layer portion 61. However, the grip portion 54 may be formed partially at the front side of the upper layer portion 61.

According to the image reading apparatus configured like this, part of the upper layer portion protrudes frontward of the wall of the lower layer portion and forms a grip portion, so that the document cover may be opened and closed by use of the grip portion. The upper layer portion usable as a grip portion may be made in a width nearly equal to that of the document cover, in the lateral direction. Thus, the document cover may be caught by the hand even at a position located deviated toward an end in the lateral direction as compared to the recess formed in a front-end center of the document cover.

Owing to an improved freedom of access with the hand, a user is allowed to bring the hand to a desired position. In the case it is not easy to bring the hand to a vicinity of an end center of the document cover for example, there is an improved capability of putting the hand to another position. This improves the easiness to handle in opening and closing operations. Meanwhile, it is also possible to put the hand in a position close to the center of gravity of the ADF. This suppresses the document cover from being distorted and improves the feeling of handling during opening and closing the document cover.

Incidentally, in the image reading apparatus according to the disclosure, various parts of the image reading apparatus are explained in their relative positional relationship by use of directional indications of up, down, left, right, front and rear. In case the image reading apparatus is assumed set up on a horizontal plane, those are defined as an up-down direction that is vertical of the horizontal plane, as front that is in a direction the grip portion protrudes and rear that is in the direction opposite thereto, and as a lateral direction that is orthogonal to both the up-down direction and the front-rear direction. However, these directions are not to regulate the relative position to an installation site of a multifunction device or the relative position between a multifunction device and a user. In case explained with a concrete example, an image reading apparatus may be used in such a state that the grip portion protrudes leftward as viewed from a user, for example. In such a direction of installation, an image reading apparatus could be fallen within the scope of the aspect of the disclosure in case various parts of the apparatus satisfy the relative positional relationship.

According to the above image reading apparatus, in the first region of the document cover which mainly bears the weight of the conveyer, the spacing between the upper layer portion and the document table is taken greater so that a user may easily put the user's hand there. Conversely, in the second region which less bears the weight of the conveyer, the spacing between the upper layer portion and the document table is taken smaller so that it is not easy for a user to put the user's hand there.

To this end, in case a user opens or closes the document cover with putting the hand in a user's desired position, the hand is naturally in a position close to the center of gravity of the conveyer during opening or closing operation. Thus, the document cover is made easy to open and close as compared to a structure that the hand is ready to be put to a position rather distant from the center of gravity of the conveyer.

In the above image reading apparatus, the center of gravity of the document cover is in a position deviated close to the left end and far from the right end with respect to the center between both ends. To meet this, the second hinge is provided in a position closer to the center between both ends than the first hinge. Thus, the first hinge and the second hinge may be arranged more equally close to the center of gravity of the document cover, as compared to the structure the first hinge and the second hinge are provided equally distant from the center between both ends. This makes it possible to open and close the document cover smoothly.

According to the above image reading apparatus, the second hinge is provided in a position off the second region. Thus, the first hinge and the second hinge are not required to be spaced excessively but may be arranged balanced in positions with respect to the center of gravity of the document cover and close in position to the center of gravity of the document cover. This makes it easy to open and close the document cover.

According to the above image reading apparatus, the operation unit is provided in the overlapping range with the first region, in which range a spacing is ensured sufficient between the conveyer and the upper layer portion. Thus, there is less possibility that the hand hits the operation unit when the document cover is opened or closed. This improves the easiness to handle in swinging the operation unit.

According to the above image reading apparatus, the operation unit may be swung and adjusted at an angle easy to operate. In such an adjustment, the operation unit may be swung manually in a place where spacing is ensured sufficient between the conveyer and the upper layer portion. This improves the easiness to handle in swinging the operation unit.

According to the above image reading apparatus, the upper layer portion is shaped with a slant surface. The conveyer is improved in appearance as compared to the structure formed with a step in a slant surface.

What is claimed is:

1. An image reading apparatus comprising:
a main body comprising a document table;
a cover comprising a rear end portion supported by the main body, and a front end portion configured to be movable with respect to the main body, the cover covering the document table in a closed position in which the front end portion of the cover is lowered, and the document table being exposed in an open position in which the front end portion is lifted;
a conveyor disposed to the cover and configured to convey a document along a conveyance path; and
a reader disposed in the main body and configured to be movable in a moving direction and to read an image of the document placed on the document table or conveyed by the conveyor,
wherein the cover comprises a lower layer portion having a wall surrounding a front, a rear, a left, and a right of the conveyer and an upper layer portion covering the conveyer from above,
wherein the lower layer portion comprises a bottom having a shape covering the document table,
wherein the wall extends upwardly from an outer periphery of the bottom,
wherein the upper layer portion comprises a grip portion which protrudes frontward from the wall,
wherein the lower layer portion further comprises a first region where the wall has a first height, the first region being overlapped, as viewed in a direction perpendicular to the document table, with a center of gravity of the conveyer, and a second region where the wall has a second height lower than the first height, the second region not overlapped, as viewed in the direction perpendicular to the document table, with the center of gravity of the conveyor, and
wherein a distance between the upper layer portion and the document table at the second region is smaller than a distance between the upper layer portion and the document table at the first region.

2. The image reading apparatus according to claim 1, wherein:
the rear end portion of the cover and the main body are coupled to each other through a hinge,
any one of the cover and the main body is rotatable relative to the hinge about an axis extending in a direction parallel to the moving direction,
the cover is arranged with a center of gravity of the cover and the conveyor being deviated to one end of the cover with respect to a geometric center between the one end and the other end of the cover in the direction parallel to the moving direction,
the hinge comprises a first hinge disposed closer to the one end of the cover with respect to the center of gravity of the cover and a second hinge disposed closer to the other end with respect to the center of gravity of the cover, and
a distance between the second hinge and the geometric center is smaller than a distance between the first hinge and the geometric center.

3. The image reading apparatus according to claim 2, wherein the second hinge is disposed in a position offset from the second region.

4. The image reading apparatus according to claim 2, wherein:
an operation unit is disposed at a front of the main body, and
the operation unit is disposed in a range overlapping with the first region in the direction parallel to the moving direction.

5. The image reading apparatus according to claim 4, wherein the operation unit is pivotally supported on the main body about an axis extending in the direction parallel to the moving direction.

6. The image reading apparatus according to claim 1, wherein:
the lower layer portion comprises a third region between the first region and the second region,
in the third region, the wall has a height decreasing in a direction from the first region toward the second region, and
the upper layer portion has a slanted surface descending in the direction from the first region toward the second region.

7. The image reading apparatus according to claim 1, wherein the grip portion extends from the one end of the cover to the other end of the cover in the direction parallel to the moving direction.

* * * * *